US010232665B2

(12) United States Patent
Takeda et al.

(10) Patent No.: US 10,232,665 B2
(45) Date of Patent: Mar. 19, 2019

(54) WHEEL COVER

(71) Applicant: TOYOTA JIDOSHA KABUSHIKI KAISHA, Toyota-shi, Aichi-ken (JP)

(72) Inventors: Tomohiko Takeda, Toyota (JP); Masanobu Mizui, Toyota (JP); Noriyoshi Matsui, Nagoya (JP); Makoto Nitta, Toyota (JP); Hiromichi Yamazaki, Toyota (JP); Yasuo Noji, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 193 days.

(21) Appl. No.: 15/484,296

(22) Filed: Apr. 11, 2017

(65) Prior Publication Data

US 2017/0341463 A1 Nov. 30, 2017

(30) Foreign Application Priority Data

May 26, 2016 (JP) ................................. 2016-105518

(51) Int. Cl.
*B60B 7/04* (2006.01)
*B60B 7/08* (2006.01)
*B60B 7/06* (2006.01)

(52) U.S. Cl.
CPC ................ *B60B 7/08* (2013.01); *B60B 7/063* (2013.01); *B60B 7/066* (2013.01)

(58) Field of Classification Search
CPC .. B60B 7/04; B60B 7/08; B60B 7/063; B60B 7/066

USPC ....................................................... 301/37.106
See application file for complete search history.

(56) References Cited

U.S. PATENT DOCUMENTS

| 4,235,476 A | * | 11/1980 | Arvidsson | ................. B60B 7/04 |
| | | | | 301/108.1 |
| 7,416,260 B1 | * | 8/2008 | Cuevas | ..................... B60B 7/08 |
| | | | | 301/37.106 |
| 7,651,171 B2 | * | 1/2010 | Kinslow | ................... B60B 7/10 |
| | | | | 301/108.1 |
| 9,375,979 B2 | * | 6/2016 | Karashima | ................ B60B 7/00 |

(Continued)

FOREIGN PATENT DOCUMENTS

| EP | 0185102 A1 * | 6/1986 | ............... B60B 7/04 |
| JP | 2005-205948 A | 8/2005 | |

(Continued)

*Primary Examiner* — Kip T Kotter
(74) *Attorney, Agent, or Firm* — Oliff PLC

(57) ABSTRACT

A wheel cover includes: a cover body having an engagement hole and configured to cover a design face of a wheel; and a cover fastener that is inserted through the engagement hole. A primary attachment member of the cover fastener includes: a supporter that supports a periphery of the engagement hole; a cylindrical portion that is inserted in a hub hole formed in the wheel; a coupler that couples the supporter and the cylindrical portion; and a hook extending from the cylindrical portion to an outer circumferential side of the cylindrical portion, the hook being contactable with an inner circumferential portion of the hub hole at a position spaced apart from an outer circumferential surface of the cylindrical portion. A secondary attachment member of the cover fastener has an insertion portion that is inserted in a space formed between the hook and the outer circumferential surface.

13 Claims, 9 Drawing Sheets

(56) References Cited

U.S. PATENT DOCUMENTS

| 9,821,599 B2 * | 11/2017 | Wang | B60B 7/08 |
| 2004/0075335 A1 * | 4/2004 | Hartl | B60B 7/04 |
| | | | 301/108.1 |
| 2014/0167491 A1 | 6/2014 | Karashima et al. | |

FOREIGN PATENT DOCUMENTS

| JP | 2006-256360 A | 9/2006 |
| JP | 2013-028325 A | 2/2013 |

* cited by examiner

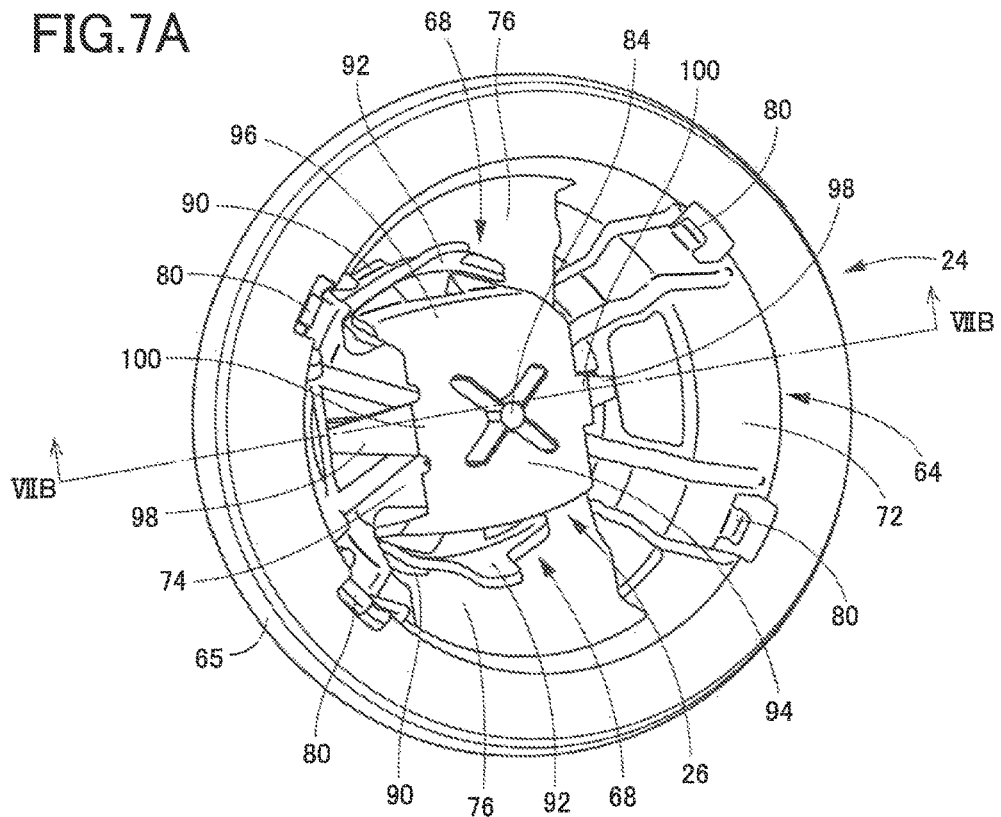
FIG.7A
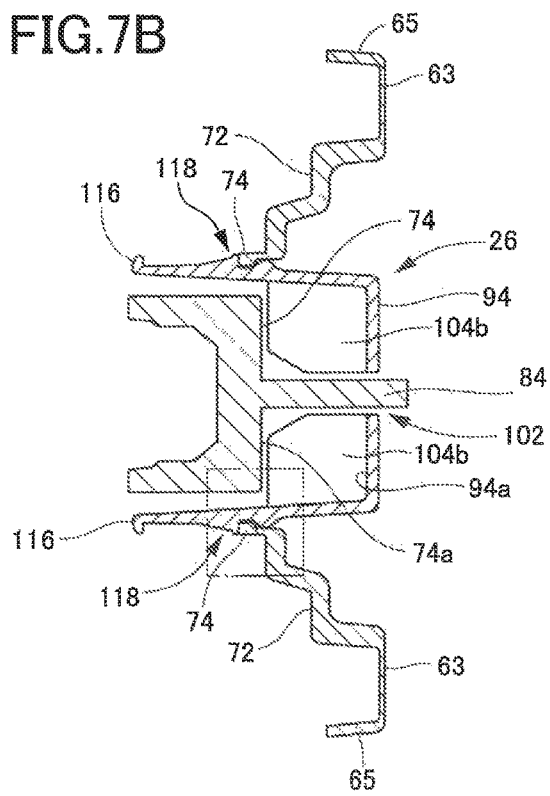
FIG.7B
FIG.7C

WHEEL COVER

CROSS REFERENCE TO RELATED APPLICATION

The present application claims priority from Japanese Patent Application No. 2016-105518, which was filed on May 26, 2016, the disclosure of which is herein incorporated by reference in its entirety.

BACKGROUND

The following disclosure relates to a wheel cover for a vehicle.

Wheels of a vehicle are covered with wheel covers for preventing brake discs from rusting due to wind and rain. For example, Patent Document 1 (Japanese Patent Application Publication No. 2013-28325) and Patent Document 2 (Japanese Patent Application Publication No. 2006-256360) disclose wheel covers including a cover body and an attachment member for installing the cover body to a wheel. A cover fastener described in Patent Document 1 includes: a mating portion that is inserted into a center ornament mount hole; and engagement protrusions provided on an outer periphery of the mating portion. The engagement protrusions are engaged with an engaging portion of the center ornament mount hole, whereby the cover body is installed on the wheel. To remove the wheel cover, a force in a direction intersecting a wheel axis is applied to the engagement protrusions. A cover fastener described in Patent Document 2 includes: an engaging hook that is engaged with an inner circumferential groove of the hub hole; and a contact portion provided on a pivot portion and engageable with the engaging groove. After the engaging hook is engaged with the inner circumferential groove, the contact portion is engaged with the engaging groove, so that the cover body is mounted on the wheel. To remove the wheel cover, the pivot portion is turned to disengage the contact portion from the engaging groove.

SUMMARY

While the wheel covers are constructed as described above, there is room for improvements because there is a possibility that the wheel cover is removed from the wheel more easily due to, e.g., water ingress to an area between the attachment member of the wheel cover and an inner-circumferential engaging portion of the wheel.

Accordingly, an aspect of the disclosure relates to a wheel cover that is not easily removed from a wheel.

In one aspect of the disclosure, a wheel cover includes: a cover body that is formed with an engagement hole at a center of the cover body and that covers a design face of a wheel of a vehicle; and a cover fastener that is inserted through the engagement hole of the cover body to install the cover body on the wheel. The cover fastener includes a primary attachment member and a secondary attachment member. The primary attachment member includes: a supporter that supports a periphery of the engagement hole; a cylindrical portion that is inserted in a hub hole formed at a center of the wheel; a coupler that couples the supporter and the cylindrical portion to each other; and a hook extending from the cylindrical portion to an outer circumferential side of the cylindrical portion, the hook being contactable with an inner circumferential portion of the hub hole at a position spaced apart from an outer circumferential surface of the cylindrical portion. The secondary attachment member includes an insertion portion that is inserted in a space formed between the hook and the cylindrical portion.

In the wheel cover constructed as described above, the insertion portion and the cylindrical portion can receive a force acting on the hook when the wheel cover is removed from the wheel. This construction makes it difficult for the wheel cover to be removed from the wheel.

Claimable Invention

There will be described by way of examples forms of inventions recognized to be claimable by the present applicant. The inventions may be hereinafter referred to as "claimable inventions" and include at least the inventions as defined in the appended claims. Nevertheless, the inventions may further include an invention of a concept subordinate or superordinate to the concept of the invention defined in the appended claims, and/or an invention of a concept different from the concept of the invention defined in the appended claims. The forms are numbered like the appended claims. Features of the claimable inventions may be implemented as features contained respectively in the following forms or as features contained respectively in combinations of two or more of the following forms. Any one of the following forms may be implemented with one or more features added, or one or more of a plurality of features included in any one of the following forms are not necessarily provided all together.

(1) A wheel cover, comprising:
a cover body that is formed with an engagement hole at a center of the cover body and that covers a design face of a wheel of a vehicle; and
a cover fastener that is inserted through the engagement hole of the cover body to install the cover body on the wheel,
wherein the cover fastener comprises a primary attachment member and a secondary attachment member,
wherein the primary attachment member comprises:
    a supporter that supports a periphery of the engagement hole;
    a cylindrical portion that is inserted in a hub hole formed at a center of the wheel;
    a coupler that couples the supporter and the cylindrical portion to each other; and
    a hook extending from the cylindrical portion to an outer circumferential side of the cylindrical portion, the hook being contactable with an inner circumferential portion of the hub hole at a position spaced apart from an outer circumferential surface of the cylindrical portion, and
wherein the secondary attachment member comprises an insertion portion that is inserted in a space formed between the hook and the outer circumferential surface of the cylindrical portion.

The cover body constructed as described above is installed on the wheel by the cover fastener, whereby the wheel cover is supported by the wheel. The secondary attachment member includes the insertion portion that is inserted in the space formed between the hook and the cylindrical portion. The insertion portion is disposed between the cylindrical portion and the hook that contacts the inner circumferential portion of the hub hole. When a force that causes the wheel cover to be removed from the wheel is applied to the wheel cover in this state, a force is generated which brings the hook closer to the outer circumferential surface of the cylindrical portion. Since the insertion portion is disposed between the hook and the cylindrical portion, the insertion portion and the cylindrical portion receive a force that causes inward deformation of the hook. This construction reduces the deformation of the hook, thereby keeping the contact between the hook and the inner circumferential portion of the hub hole. This contact makes it more difficult for the wheel cover to be removed from the wheel. As described above, the inner circumferential portion of the hub hole is constructed such that the inner circumferential surface of the hub hole contacts the hook. However, an engaging portion engageable with the hook may or may not be formed on the inner circumferential surface of the hub hole. The supporter at least needs to include a portion that contacts the periphery of the engagement hole to support the cover body, and the shape of the supporter is not limited. The hook at least needs to contact the inner circumferential portion of the hub hole and thereby generate a force against the force that causes the wheel cover to be removed from the wheel. The force against the force that causes the wheel cover to be removed from the wheel may not be generated by the engagement between the hook and the inner circumferential portion of the hub hole and may be generated by the contact between the hook and the inner circumferential portion of the hub hole. The insertion portion is inserted in the space formed between the hook and the cylindrical portion, and thus the insertion portion has a size related to the size of the space formed between the hook and the cylindrical portion. For example, the size of the insertion portion may be substantially equal to, slightly greater than, or slightly less than the size of the space.

(2) The wheel cover according to the above form (1), wherein the hook of the primary attachment member is engageable with an inner-circumferential engaging portion formed at the inner circumferential portion of the hub hole.

In the construction described above, the hook is engaged with the inner-circumferential engaging portion. Accordingly, the wheel cover is not easily removed from the wheel when compared with the case where the hook contacts the inner circumferential portion of the hub hole which does not have the inner-circumferential engaging portion.

(3) The wheel cover according to the above form (1) or (2),
wherein the primary attachment member comprises a plurality of hooks each as the hook,
wherein the secondary attachment member comprises a plurality of insertion portions each as the insertion portion, and
wherein each of the plurality of insertion portions is inserted in a space formed between the outer circumferential surface of the cylindrical portion and a corresponding one of the plurality of hooks.

In the construction described above, when each of distal ends of the respective insertion portions is inserted in the space formed between the corresponding hook and the outer circumferential surface of the cylindrical portion, the insertion portions can receive, at a plurality positions, a force applied from the inner circumferential portion of the hub hole to the distal ends of the respective insertion portions. This construction makes it more difficult for the wheel cover to be removed from the wheel.

(4) The wheel cover according to the above form (3), wherein the plurality of insertion portions are spaced uniformly in an inner circumferential direction of the hub hole, and the plurality of hooks are spaced uniformly in the inner circumferential direction of the hub hole.

In the construction described above, when each of distal ends of the respective insertion portions is inserted in the space formed between the corresponding hook and the outer circumferential surface of the cylindrical portion, the distal ends of the respective insertion portions uniformly apply forces to the inner circumferential surface of the hub hole. This construction makes it more difficult for the wheel cover to be removed from the wheel.

(5) The wheel cover according to any one of the above forms (1) through (4), wherein the supporter has a flange shape.

In the construction described above, a force against a force that is generated when the cover body is removed from the wheel can be uniformly applied to the periphery of the engagement hole. This construction makes it more difficult for the wheel cover to be removed from the wheel.

(6) The wheel cover according to any one of the above forms (1) through (5),
wherein the primary attachment member further comprises a first engaging portion, and
wherein the secondary attachment member further comprises a lock engaging portion that is engaged with the first engaging portion when the insertion portion is inserted in a space formed between the cylindrical portion and the hook.

In the construction described above, when the insertion portion is inserted in the space formed between the hook and the outer circumferential surface of the cylindrical portion, the first engaging portion and the lock engaging portion are engaged with each other, whereby the secondary attachment member is held in this state, making it more difficult for the secondary attachment member to be removed from the primary attachment member. This construction makes it more difficult for the wheel cover to be removed from the wheel.

(7) The wheel cover according to the above form (6),
wherein the secondary attachment member comprises an engaging piece comprising the lock engaging portion, and
wherein the engaging piece comprises a temporarily-holding engaging portion that is located nearer to a distal end of the engaging piece than the lock engaging portion and that is engaged with the first engaging portion.

In the construction described above, the secondary attachment member is held by the primary attachment member in a state in which the temporarily-holding engaging portion of the engaging piece is engaged with the first engaging portion of the primary attachment member. It is noted that this state may be hereinafter referred to as "temporarily holding state of the secondary attachment member". This construction makes it easier to handle the primary attachment member and the secondary attachment member as a single component.

(8) The wheel cover according to the above form (7), wherein a thickness of the engaging piece increases with increase in distance from the temporarily-holding engaging portion toward the lock engaging portion.

In the construction described above, the secondary attachment member is allowed to move toward the primary attachment member in the temporarily holding state of the secondary attachment member. Since the thickness of the engaging piece increases with increase in distance from the temporarily-holding engaging portion toward the lock engaging portion, it is difficult for the secondary attachment member to move away from the primary attachment member. That is, in this state, it is at least necessary to reduce a possibility of removal of the secondary attachment member from the primary attachment member, and the secondary attachment member is allowed to move toward the primary attachment member. This construction allows an operator to push the secondary attachment member being in the temporarily holding state toward the primary attachment member to switch to a state in which the first engaging portion is spaced apart from the temporarily-holding engaging portion and engaged with the lock engaging portion. It is noted that the temporarily-holding engaging portion may be shaped such that an amount of protrusion of a protruding edge of the temporarily-holding engaging portion which is nearer to the lock engaging portion is less than that of protrusion of a protruding edge of the temporarily-holding engaging portion which is nearer to the distal end of the engaging piece. Alternatively, the temporarily-holding engaging portion may be shaped such that only its protruding edge located nearer to the distal end protrudes without providing the protruding edge located nearer to the lock engaging portion.

(9) The wheel cover according to any one of the above forms (3) through (8), wherein the secondary attachment member comprises a base portion that couples the plurality of insertion portions to each other.

In the construction described above, the operator can pull out the base portion to pull the plurality of insertion portions out of the primary attachment member at a time.

(10) The wheel cover according to the above form (9),
wherein the secondary attachment member comprises a plurality of engaging pieces each as the engaging piece,
wherein the base portion is configured to couple the plurality of engaging pieces to each other, and
wherein a plurality of protrusions are formed each at a portion of the base portion which is coupled to a corresponding one of the plurality of engaging pieces.

In the construction described above, the operator can bend the plurality of engaging pieces while holding the plurality of protrusions, and pull the secondary attachment member out of the primary attachment member. This construction improves efficiency of the removal of the secondary attachment member from the primary attachment member.

(11) The wheel cover according to any one of the above forms (1) through (10),
wherein the primary attachment member further comprises a first facing surface,
wherein the secondary attachment member further comprises a second facing surface that is opposed to the first facing surface when the secondary attachment member is mounted on the primary attachment member,
wherein the first facing surface comprises a first guide, and
wherein the second facing surface comprises a second guide that guides the first guide.

In the construction described above, when the secondary attachment member is mounted on the primary attachment member, the first guide guides the second guide. As a result, the secondary attachment member is mounted on the primary attachment member at a position at which the insertion portion is inserted in the hook.

(12) The wheel cover according to the above form (11),
wherein the first guide is provided on the first facing surface so as to extend from the first facing surface toward the second facing surface, and
wherein the second guide is provided on the second facing surface so as to extend from the second facing surface toward the first facing surface.

In the construction described above, when the secondary attachment member is mounted on the primary attachment member, the second guide being in contact with the first guide is guided in a direction in which the second facing surface is moved toward the first facing surface. This construction enables the insertion portion to be well inserted into the space formed between the hook and the outer circumferential surface of the cylindrical portion.

(13) The wheel cover according to any one of the above forms (1) through (10),
wherein the primary attachment member comprises a first guide, and
wherein the secondary attachment member comprises a through hole in which the first guide is insertable.

In the construction described above, the first guide extends through the through hole in a state in which the insertion portion of the secondary attachment member is inserted in the space formed between the hook and the outer circumferential surface of the cylindrical portion (noted that this state may be hereinafter referred to as "mounted state of the secondary attachment member"). In the state in which the first guide extends through the through hole, the first guide is exposed to the outside of the base portion. This state allows the operator to visually recognize the mounted state of the secondary attachment member.

(14) The wheel cover according to any one of the above forms (1) through (13), wherein the cylindrical portion comprises an opening that opens toward an inside of the vehicle.

In the construction described above, in the case of a wheel in which a drive shaft extends to the inner circumferential portion of the hub hole, when the primary attachment member is inserted into the hub hole, a distal end of the drive shaft is inserted into the opening of the cylindrical portion. On the other hand, in the case of a wheel which is not driven by the drive shaft or in which the drive shaft does not extend to the inner circumferential portion of the hub hole, when the primary attachment member is inserted into the hub hole, the distal end of the drive shaft is not inserted into the opening of the cylindrical portion. It is not essential that the distal end of the drive shaft is inserted into the opening of the cylindrical portion in the state in which the cylindrical portion is inserted in the inner circumferential portion of the hub hole. Thus, it is possible to install the wheel cover on any of the drive wheel and the driven wheel.

(15) A method of installing a wheel cover onto a wheel, the wheel cover comprising: a cover body that covers a design face of the wheel of a vehicle; a primary attachment member that supports the cover body and comprises (i) a supporter, (ii) a cylindrical portion, (iii) a coupler that couples the supporter and the cylindrical portion to each other, and (iv) a hook extending from the cylindrical portion; and a secondary attachment member comprising an insertion portion that is inserted in a space formed between the hook and an outer circumferential surface of the cylindrical portion,
the method comprising:
mounting the secondary attachment member onto the primary attachment member in a state in which the insertion portion is not inserted in the space formed between the hook and the outer circumferential surface of the cylindrical portion;
mounting the primary attachment member and the secondary attachment member onto the cover body to establish a state in which the cylindrical portion and the hook are inserted in an engagement hole formed at a center of the cover body;
mounting the cover body, the primary attachment member, and the secondary attachment member onto the wheel to establish a state in which the cylindrical portion and the hook are inserted in a hub hole formed in the wheel; and pushing the secondary attachment member into the primary attachment member to establish a state in which the insertion portion is inserted into the space formed between the hook and the outer circumferential surface of the cylindrical portion.

In the construction described above, the secondary attachment member is mounted on the primary attachment member in advance, whereby the secondary attachment member is temporarily held on the primary attachment member, enabling the secondary attachment member and the primary attachment member to be handled as a single component. By mounting, onto the cover body, the primary attachment member on which the secondary attachment member is temporarily held, the secondary attachment member, the primary attachment member, and the cover body can be mounted together on the wheel. The hook is in contact with the inner circumferential portion of the hub hole in the state in which the secondary attachment member, the primary attachment member, and the cover body are mounted on the wheel. When the secondary attachment member is pushed toward the primary attachment member in this state, the insertion portion is inserted into the space formed between the hook and the outer circumferential surface of the cylindrical portion. In this state, the insertion portion and the cylindrical portion receive a force acting from the inner circumferential portion of the hub hole to the hook. With this construction, the wheel cover not easily removed from the wheel can be installed on the wheel.

BRIEF DESCRIPTION OF THE DRAWINGS

The objects, features, advantages, and technical and industrial significance of the present disclosure will be better understood by reading the following detailed description of the embodiments, when considered in connection with the accompanying drawings, in which:

FIG. 7A is a perspective view of the center piece and the stopper in the first embodiment, with the stopper being mounted on the center piece and viewed from the outside of the vehicle, FIG. 7B is a cross-sectional view of the stopper and the center piece, taken along line VIIB-VIIB, and FIG. 7C is an enlarged view of an area at which the stopper and the center piece are engaged with each other;

DETAILED DESCRIPTION OF THE EMBODIMENTS

Figure 1:
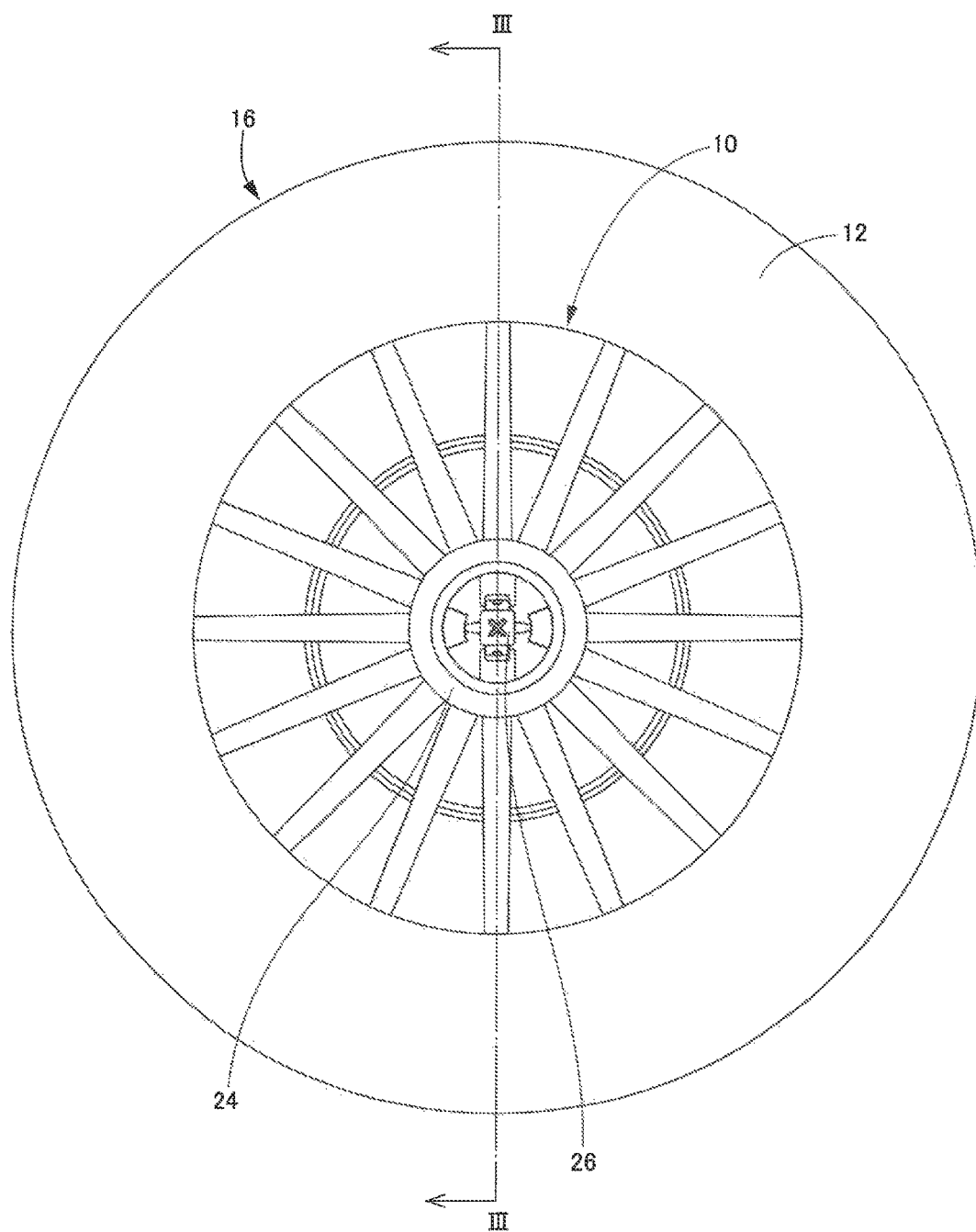
FIG. 1 is a schematic view of a wheel and a wheel cover according to the first embodiment, with the wheel cover installed on the wheel.
Figure 2:
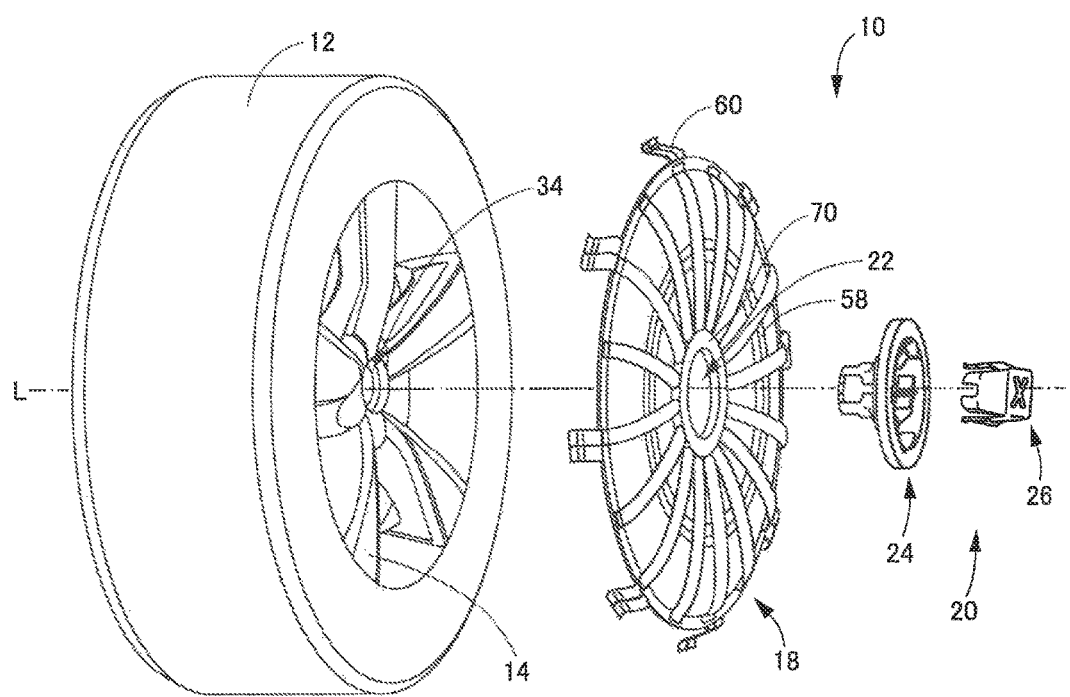
FIG. 2 is an exploded view of the wheel cover according to the first embodiment.

Hereinafter, there will be described embodiments by reference to the drawings. FIG. 1 is a front elevational view of a wheel assembly 16 installed with a wheel cover 10 according to a first embodiment. FIG. 2 is an exploded view of the wheel cover 10. The wheel cover 10 includes a cover body 18 and a cover fastener 20. The cover body 18 is shaped like a disc having an engagement hole 22 at its central portion. The cover body 18 covers at least a portion of a wheel 14. The wheel assembly 16 includes a tire 12 and the wheel 14.

The cover fastener 20 includes a center piece 24 and a stopper 26 and fastens the cover body 18 to the wheel 14. Central axes of the cover body 18 and the cover fastener 20 coincide with a wheel axis L in a state in which the cover body 18 and the cover fastener 20 are mounted on the wheel 14. The center piece 24 is one example of a primary attachment member, and the stopper 26 is one example of a secondary attachment member. In the present specification, the wording "outside" or "outer side" is a side of the wheel assembly 16 on which a vehicle body is located in a state in which the wheel assembly 16 is assembled to the vehicle, and the wording "inside" or "inner side" is an opposite side of the wheel assembly 16 from the outside in the state in which the wheel assembly 16 is assembled to the vehicle. In FIG. 1, the outside is a side on which a design face of the wheel 14 is located, and the inside is an opposite side of the wheel from the design face. In FIG. 2, the inside is a left side in FIG. 2, and the outside is a right side in FIG. 2. The wheel assembly 16 is a drive wheel in the present embodiment.

Figure 3:
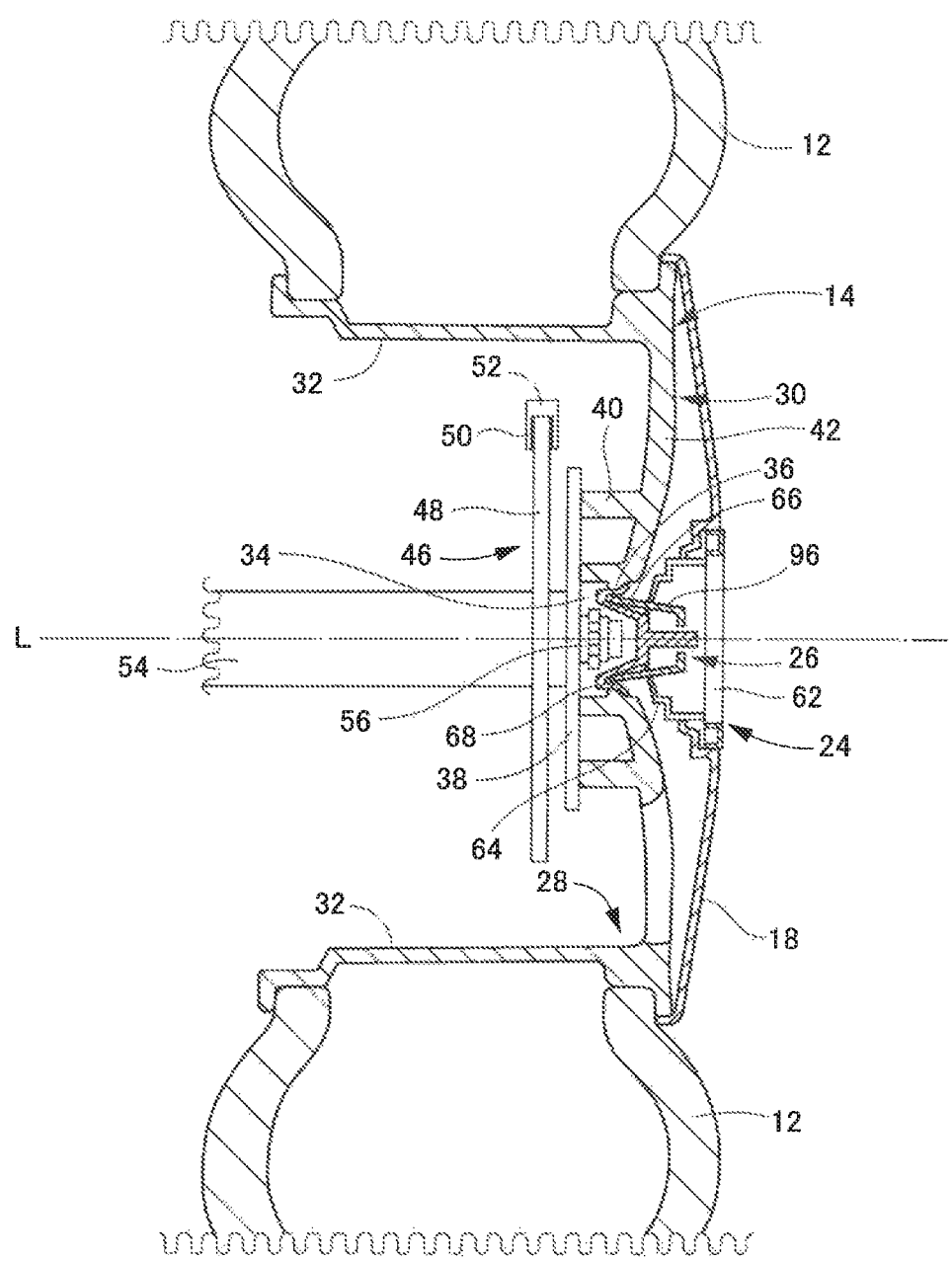
FIG. 3 is a cross-sectional view of the wheel, taken along line III-III in FIG. 1.

FIG. 3 is a cross-sectional view taken along line III-III in FIG. 1. The wheel 14 includes a tire holder 28. The tire holder 28 includes a disc portion 30 and an annular rim 32 provided on an outside edge of the disc portion 30. The tire 12 is held by the rim 32. The center of the disc portion 30 is formed with an ornament mount hole 34 extending along the axis of the wheel 14. An ornament is mounted in the ornament mount hole 34. The disc portion has an inner-circumferential engaging portion for mounting the ornament. The inner-circumferential engaging portion 36 partly defines the ornament mount hole 34. The inner-circumferential engaging portion 36 is a ridge formed around the ornament mount hole 34. The inner-circumferential engaging portion 36 is to be engaged with respective two outer-circumferential protrusions 90 of a pair of engaging hooks 68 which will be described below. The ornament mount hole 34 is one example of a hub hole.

The disc portion 30 includes a hub mount 40 and five spokes 42. A hub 38 is to be mounted in the hub mount 40. The spokes couple the hub mount 40 and the rim 32 to each other. The spokes 42 are spaced uniformly in the circumferential direction.

A disc brake 46 is provided on an inner side of the hub 38. The disc brake 46 includes: a rotating member 48 that is rotated together with the wheel 14; and a caliper 52 that presses a friction member 50 against the rotating member 48. An axle 54 containing a drive shaft 56 extends through central portions of the hub 38 and the rotating member 48. A distal end of the drive shaft 56 is inserted in the ornament mount hole 34.

Cover Body

The wheel cover 10 covers the design face of the wheel 14 of the vehicle. When installing the wheel cover 10 on the wheel 14, the cover fastener 20 is inserted through the engagement hole 22 formed in the cover body 18 and engaged with the inner-circumferential engaging portion 36. This state may be hereinafter referred to as "installed state of the wheel cover 10". The cover body 18 is shaped like a disc as described above and curved such that a central portion of the cover body 18 protrudes outward in the installed state of the wheel cover 10. This construction forms a space between the disc portion 30 and the cover body 18, making it possible to install the wheel cover 10 on various kinds of wheels using this space. As illustrated in FIG. 2, an annular bead 58 is formed on an outer surface of the cover body 18 at a position between an inner edge and an outer edge of the cover body 18. The outer edge of the cover body 18 is provided with outer-circumferential hooks 60 that are to be engaged with the rim 32. The bead 58 enhances the stiffness of the cover body 18. The outer-circumferential hooks 60 enables the cover body 18 to be held on the wheel 14.

Center Piece

Figure 4:
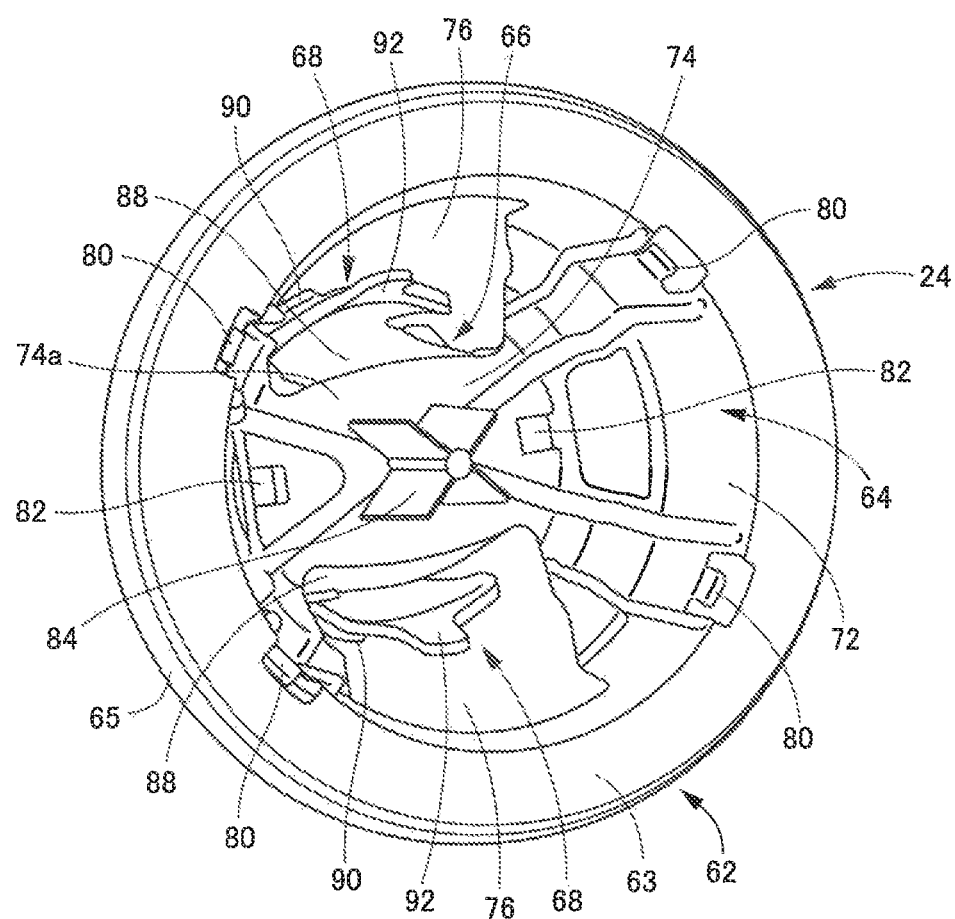
FIG. 4 is a perspective view of a center piece in the first embodiment, with the center piece being viewed from an outside of a vehicle.

FIG. 4 is a perspective view of the center piece viewed from the outside of the vehicle in the installed state of the wheel cover 10. The center piece 24 is formed by molding of resin. The center piece 24 is mounted on the wheel 14 with the cover body 18 and the stopper 26 as illustrated in FIG. 1, but FIG. 4 illustrates only the center piece 24 for clarity of the construction of the center piece 24. The center piece 24 includes a flange 62, a coupler 64, a cylindrical portion 66, and the engaging hooks 68.

Flange

The flange 62 has an annular shape centered about a point on the wheel axis in the installed state of the wheel cover 10. The flange 62 has an annular portion 63 and an extending portion 65 extending from the outermost edge of the annular portion 63 to an inner side of the vehicle. In the installed state of the wheel cover 10, the flange 62 supports the cover body 18 by contacting an engagement-hole periphery 70 (see FIG. 2) that is a periphery of the engagement hole 22 formed in the cover body 18. A plurality of flange reinforcement frames, not illustrated, are provided on an inner surface of the flange 62 in the installed state of the wheel cover 10. The flange reinforcement frames are spaced uniformly in the circumferential direction of the annular portion 63 to enhance the stiffness of the flange 62. The flange 62 is one example of a supporter. It is noted that the supporter at least needs to have a portion overlapping the engagement-hole periphery 70, and the shape of the portion is not limited to the flange shape.

Coupler

The coupler 64 is shaped like a plate including a cylindrical side-surface portion 72 and a coupling bottom surface portion 74. The coupler 64 is located between the flange 62 and the cylindrical portion 66 to couple the flange 62 and the cylindrical portion 66 to each other. The cylindrical side-surface portion 72 extends from an inner edge of the annular portion 63 of the flange 62 to the coupling bottom surface portion 74 in a direction toward the inside of the vehicle. The inside diameter of the cylindrical side-surface portion 72 gradually decreases from the annular portion 63 to the coupling bottom surface portion 74. The length of the center piece 24 can be changed in the depth direction of the cylindrical side-surface portion 72, i.e., the direction directed from the outside toward the inside of the vehicle, allowing the center piece 24 to be mounted on various kinds of wheels having the ornament mount holes 34 with different depths. The cylindrical side-surface portion 72 has a pair of through holes 76 opposed to each other. The cylindrical side-surface portion 72 is provided with four engagement protrusions 80 at its end portion near the inner edge of the annular portion 63. The four engagement protrusions 80 are spaced apart from each other in the circumferential direction of the cylindrical side-surface portion 72.

The coupling bottom surface portion 74 is a substantially rectangular plate member. The coupling bottom surface portion 74 is provided such that a coupling bottom surface 74a that is an outer surface of the coupling bottom surface portion 74 is perpendicular to the wheel axis in the installed state of the wheel cover 10. The coupling bottom surface portion 74 has a pair of insertion holes 82 and a cross-shaped protrusion 84. A pair of long sides of the rectangular coupling bottom surface portion 74 respectively define inner end portions of the respective through holes 76 formed in the cylindrical side-surface portion 72. The pair of insertion holes 82 are respectively formed near a pair of short sides of the coupling bottom surface portion 74. The pair of insertion holes 82 are formed through the coupling bottom surface portion 74. A pair of engaging pieces 98, which will be described below, provided on the stopper 26 are inserted through the respective insertion holes 82. The cross-shaped protrusion 84 extends outward from the coupling bottom surface portion 74. The cross-shaped protrusion 84 has two plates extending perpendicular to the coupling bottom surface 74a. These plates are perpendicularly to each other but may intersect each other at angles other than 90 degrees. The coupling bottom surface 74a is one example of a first facing surface. The cross-shaped protrusion 84 is one example of a first guide.

Cylindrical Portion

In the installed state of the wheel cover 10, the cylindrical portion 66 is inserted in the ornament mount hole 34. The cylindrical portion 66 includes cylindrical side surface portions 88 each extending inward (toward the vehicle body) from an inner surface (nearer to the vehicle body) of the coupling bottom surface portion 74. The axis of the cylindrical side surface portions 88 coincides with the wheel axis. An inner end portion (nearer to the vehicle body) of the cylindrical portion 66 which is defined by the cylindrical side surface portions 88 is hollow and open. Thus, the drive shaft 56 is inserted in the inner end portion of the cylindrical portion 66 in the installed state of the wheel cover 10.

Engaging Hooks

The pair of engaging hooks 68 extend outward in the radial direction respectively from inner end portions of the respective cylindrical side surface portions 88. The pair of engaging hooks 68 then extend toward the outside of the vehicle such that a space is formed between each of the engaging hooks 68 and an outer circumferential surface of a corresponding one of the cylindrical side surface portions 88. In the installed state of the wheel cover 10, the pair of engaging hooks 68 are in contact with an inner circumferential surface of the ornament mount hole 34. The pair of engaging hooks 68 are spaced at an angle of 180 degrees in the circumferential direction of the inner circumferential surface of the ornament mount hole 34. Each of the pair of engaging hooks 68 has a shape along the inner circumferential surface of the ornament mount hole 34. Each of the pair of engaging hooks 68 includes the two outer-circumferential protrusions 90 and a handle 92.

Figure 8A:
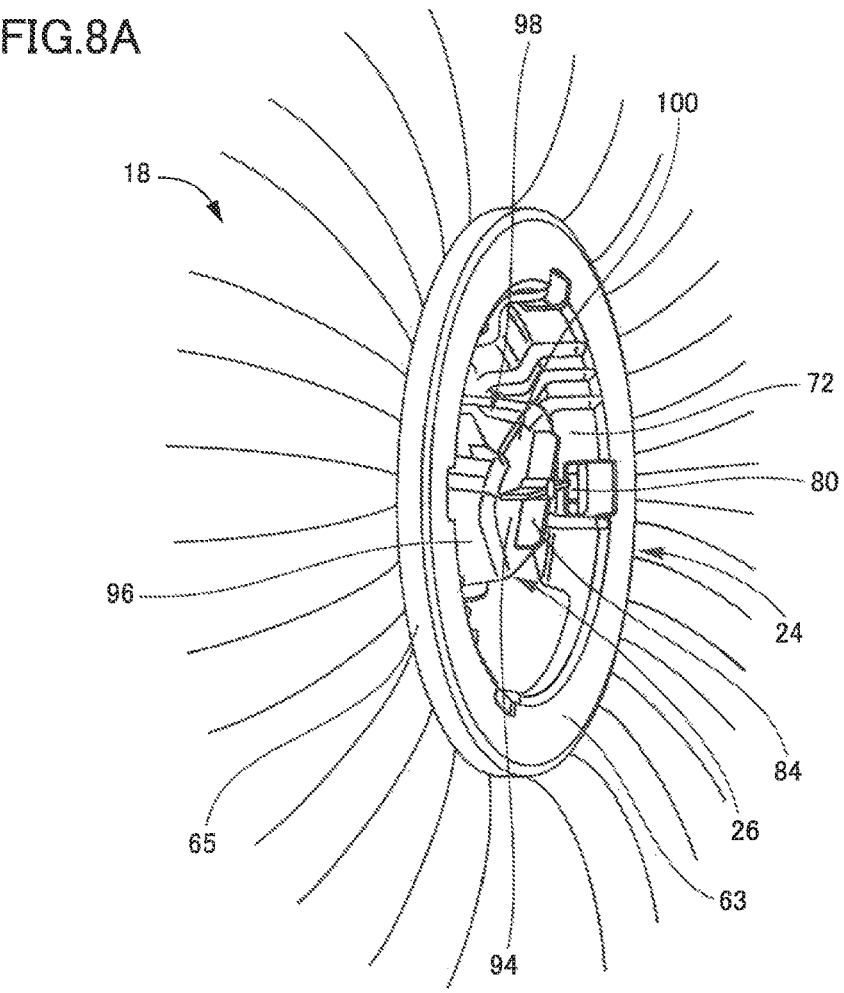
FIG. 8A is a perspective view of the wheel installed with the wheel cover according to the first embodiment, with the wheel being viewed from the outside of the vehicle.
Figure 8B:
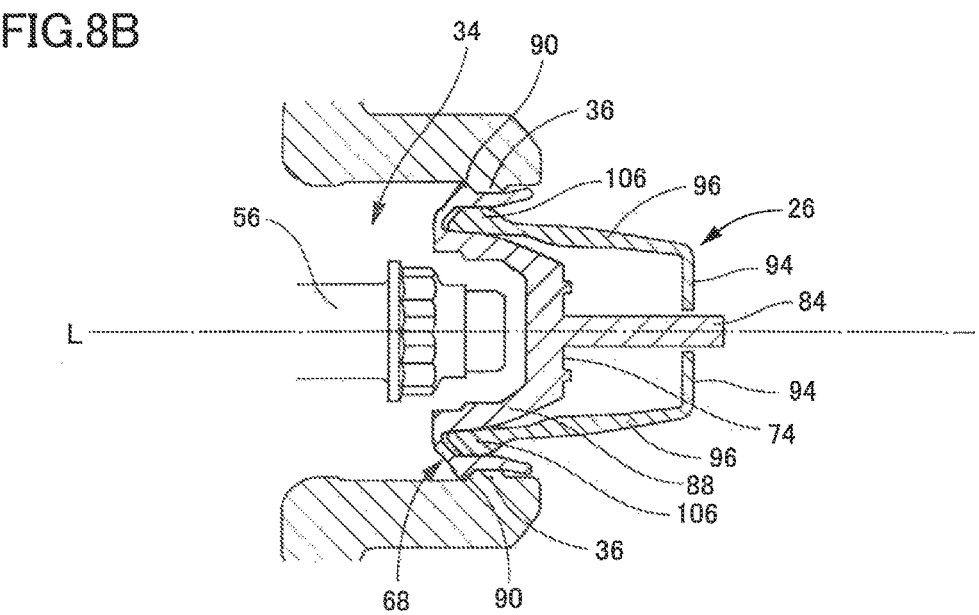
FIG. 8B is a cross-sectional view of the center piece, the stopper, and an ornament mount hole.

As illustrated in FIG. 8B which will be described below, the two outer-circumferential protrusions 90 are provided on an inner end portion (nearer to the vehicle) of the engaging hook 68. In the installed state of the wheel cover 10, the two outer-circumferential protrusions 90 are spaced apart from each other along the inner circumferential surface of the ornament mount hole 34. The two outer-circumferential protrusions 90 protrude from the engaging hook 68 toward the inner circumferential surface of the ornament mount hole 34. The two outer-circumferential protrusions 90 are engaged with the inner-circumferential engaging portion 36 of the ornament mount hole 34 in the state in which the wheel cover 10 is installed on the wheel 14. The handle 92 is an outer end portion of the engaging hook 68 which is farther from the vehicle. The width of the handle 92 is less than that of the other portion of the engaging hook 68. When removing the wheel cover 10 from the wheel 14, an operator holds the handles 92 to pull the cover fastener 20 out of the ornament mount hole 34. Each of the pair of engaging hooks 68 is one example of a hook.

Stopper

Figure 5A:
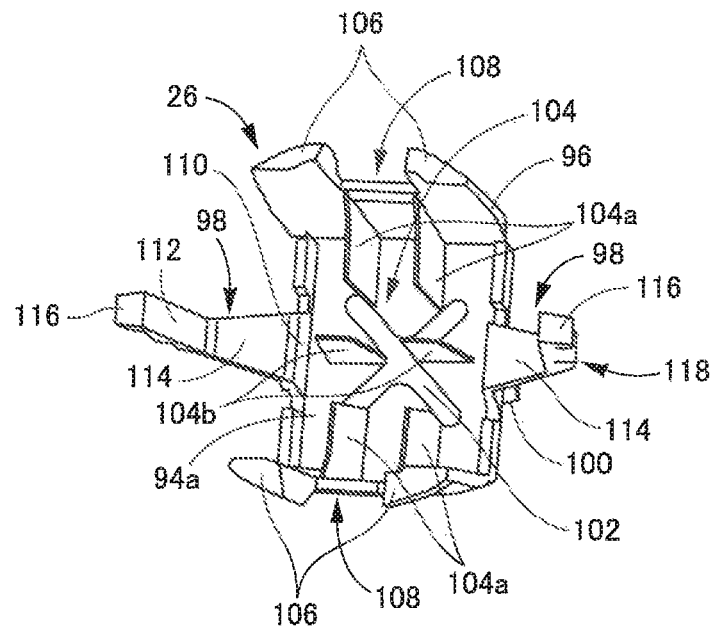
FIG. 5A is a perspective view of a stopper in the first embodiment, with the stopper being viewed from an inside of the vehicle.
Figure 5B:
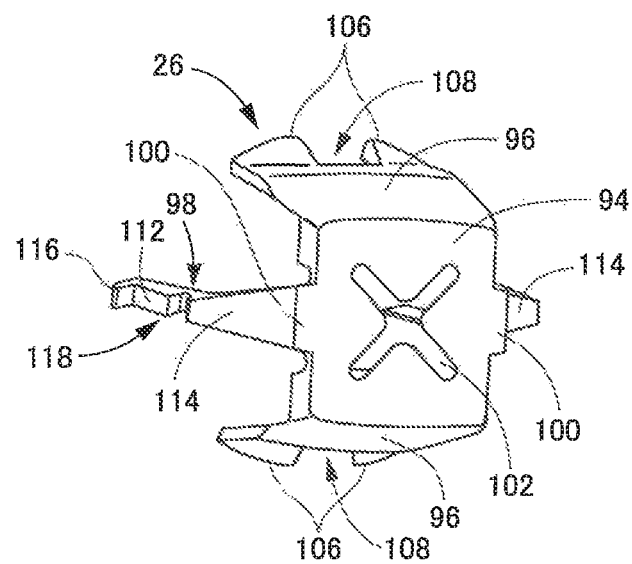
FIG. 5B is a perspective view of the stopper in the first embodiment, with the stopper being viewed from the outside of the vehicle.

FIG. 5A is a perspective view of the stopper 26 viewed from the inside of the vehicle in the installed state of the wheel cover 10. FIG. 5B is a perspective view of the stopper 26 viewed from the outside of the vehicle in the installed state of the wheel cover 10. As illustrated in FIG. 1, the stopper 26 is mounted on the wheel 14 with the cover body 18 and the center piece 24, but FIGS. 5A and 5B illustrate only the stopper 26 for clarity of the construction of the stopper 26.

Figure 6A:
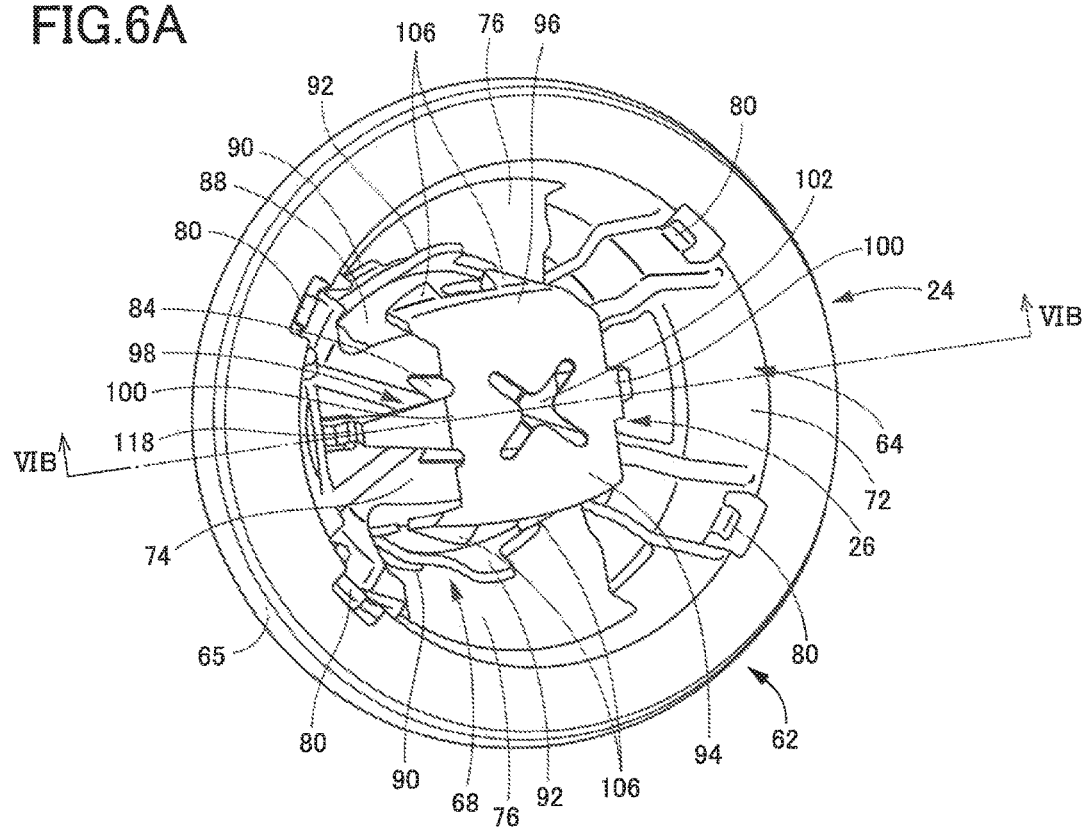
FIG. 6A is a perspective view of the center piece and the stopper in the first embodiment, with the stopper being mounted on the center piece and viewed from the outside of the vehicle.
Figure 6B:
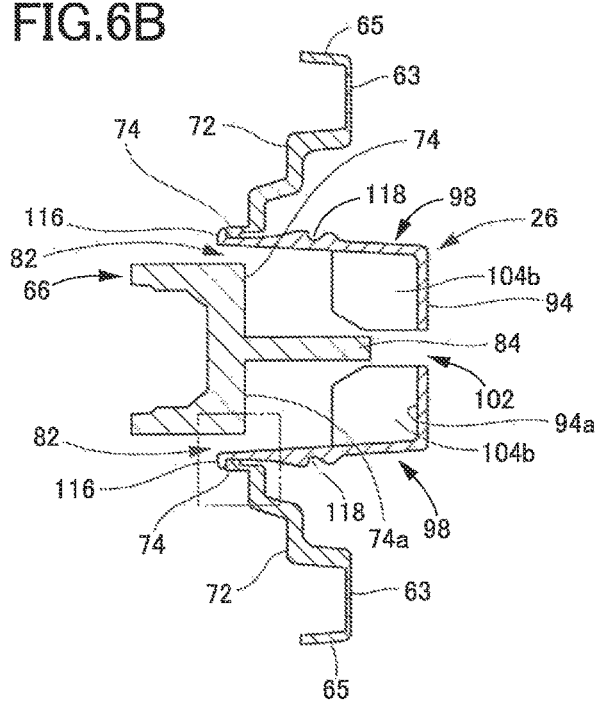
FIG. 6B is a cross-sectional view of the stopper and the center piece, taken along line VIB-VIB.
Figure 6C:
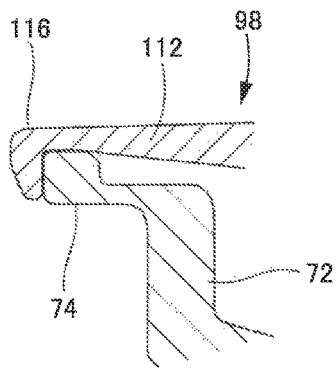
FIG. 6C is an enlarged view of an area at which the stopper and the center piece are engaged with each other.

FIG. 6A is a perspective view of the center piece 24 and the stopper 26 viewed from the outside of the vehicle, in a state in which temporarily-holding hooks 116 of the stopper 26 which will be described below are respectively inserted in the pair of insertion holes 82 of the center piece 24 and engaged with the coupling bottom surface portion 74. It is noted that this state may be hereinafter referred to as "temporarily holding state of the stopper 26". FIG. 6B is a cross-sectional view in the temporarily holding state, schematically illustrating a relative positional relationship between the center piece 24 and the stopper 26 in this state. FIG. 6C is an enlarged view of an area enclosed by the one-dot chain line in FIG. 6B, at which the stopper 26 and the center piece 24 are engaged with each other.

FIG. 7A is a perspective view of the center piece 24 and the stopper 26 viewed from the outside of the vehicle in the installed state of the wheel cover 10. FIG. 7B is a cross-sectional view in the installed state of the wheel cover 10, schematically illustrating a relative positional relationship between the center piece 24 and the stopper 26 in this state. FIG. 7C is an enlarged view of an area enclosed by the one-dot chain line in FIG. 7B, at which the stopper 26 and the center piece 24 are engaged with each other. FIGS. 7A-7C omit illustration of the cover body 18 and the wheel 14.

The stopper 26 is formed of resin of a color different from that of the center piece 24. The stopper 26 includes a rectangular bottom surface portion 94, insertion portions 96, the engaging pieces 98, operating protrusions 100, slits 102, and six guide protrusions 104.

Rectangular Bottom Surface Portion

As illustrated in FIG. 5B, the rectangular bottom surface portion 94 is a rectangular plate provided with the pair of insertion portions 96 and the pair of engaging pieces 98. As illustrated in FIG. 5A, an inner surface of the rectangular bottom surface portion 94 serves as a rectangular bottom surface 94a. When the stopper 26 is mounted on the center piece 24, the rectangular bottom surface 94a is opposed to the coupling bottom surface 74a of the center piece 24. The guide protrusions 104 which will be described below are formed on the rectangular bottom surface 94a. The rectangular bottom surface portion 94 is one example of a base portion. The rectangular bottom surface 94a is one example of a second facing surface. Each of the guide protrusions 104 is one example of a second guide.

Insertion Portions

The pair of insertion portions 96 extend substantially perpendicularly to the rectangular bottom surface portion 94 from a pair of short sides of the rectangular bottom surface portion 94 toward the inside of the vehicle. A distal end of each of the pair of insertion portions 96 of the stopper 26 is formed with two distal end protrusions 106 spaced apart from each other. These distal end protrusions 106 are formed at positions corresponding to the respective outer-circumferential protrusions 90 of the center piece 24. The two distal end protrusions 106 protrude toward the inner circumferential surface of the ornament mount hole 34. In the installed state of the wheel cover 10, each of the distal end protrusions 106 is inserted in the space formed between a corresponding one of the pair of engaging hooks 68 and the outer circumferential surface of a corresponding one of the cylindrical side surface portions 88.

Each of the pair of insertion portions 96 has a cutout 108 between the two distal end protrusions 106. The cutouts 108 are opposed to the respective handles 92 in the temporarily holding state of the stopper 26. In the temporarily holding state of the stopper 26, the operator bends the handles 92 from the inner circumferential surface of the ornament mount hole 34 toward the respective cylindrical side surface portions 88 and presses the handles 92 in the respective cutouts 108 in the state in which the handles 92 are bent. This state allows the operator to bend the pair of insertion portions 96 toward the respective cylindrical side surface portions 88 and remove the center piece 24 from the wheel 14.

Engaging Pieces

Each of the pair of engaging pieces 98 includes an outer end portion 110, an inner end portion 112, and a resilient deformation portion 114 connecting between the outer end portion 110 and the inner end portion 112. As illustrated in FIG. 5A, the outer end portion 110 extends from a corresponding one of long sides of the rectangular bottom surface portion 94 to the resilient deformation portion 114. The outer end portion 110 extends substantially perpendicularly to the rectangular bottom surface portion 94 from the long side of the rectangular bottom surface portion 94 toward the inside of the vehicle. The resilient deformation portion 114 extends from an inner end portion of the outer end portion 110 so as to be nearer to the inner circumferential surface of the ornament mount hole 34 as the resilient deformation portion 114 extends inward from the inner end portion of the outer end portions 110. Each of the outer end portion 110 and the resilient deformation portion 114 has a width decreasing from its outer portion toward its inner portion. That is, the size of each of the outer end portion 110 and the resilient deformation portion 114 in a direction parallel with the long side of the rectangular bottom surface portion 94 decreases from its outer portion toward its inner portion.

The inner end portion 112 extends inward from an inner end portion of the resilient deformation portion 114 so as to be parallel with the wheel axis. The temporarily-holding hook 116 is formed at a distal end portion of the inner end portions 112. A lock groove 118 is formed in a portion of the inner end portion 112 which is coupled to the resilient deformation portion 114. The thickness of the inner end portion 112 decreases with decrease in distance from the lock groove 118 toward the temporarily-holding hook 116.

As illustrated in FIG. 6B, the temporarily-holding hook 116 is engaged with the coupling bottom surface portion 74 when the pair of engaging pieces 98 are inserted in the respective insertion holes 82 formed in the center piece 24. In this state, as illustrated in FIG. 6A, the two distal end protrusions 106 of each of the insertion portions 96 are not inserted in the space formed between the corresponding one of the pair of engaging hooks 68 and the outer circumferential surface of the cylindrical side surface portion 88. The temporarily holding state of the stopper 26 is the state in which the stopper 26 is mounted on the center piece 24 before the cover body 18 is installed on the wheel 14.

As illustrated in FIG. 7B, the lock groove 118 has: a protruding edge located nearer to the rectangular bottom surface portion 94; and a protruding edge located nearer to a distal end of the engaging piece 98. When the two distal end protrusions 106 of each of the insertion portions 96 are inserted in the space formed between the corresponding engaging hook 68 and the outer circumferential surface of the cylindrical side surface portion 88, the protruding edges nearer to the distal end of the lock grooves 118 are inserted through the respective insertion holes 82 formed in the center piece 24 and engaged with the coupling bottom surface portion 74 that defines the pair of insertion holes 82. The shape of each of the two protruding edges of the lock groove 118 is not limited to the shape in the present embodiment. However, since there is a possibility that the stopper 26 is not moved but disengaged outward in the installed state of the wheel cover 10, the angle of the protruding edge located nearer to the rectangular bottom surface portion 94 is preferably greater than that of the protruding edge located nearer to the distal end. The coupling bottom surface portion 74 that defines the pair of insertion holes 82 is one example of a first engaging portion. Each of the temporarily-holding hooks 116 is one example of a temporarily-holding engaging portion. Each of the lock grooves 118 is one example of a lock engaging portion.

Operating Protrusions

As illustrated in FIG. 5B, the operating protrusions 100 are formed so as to correspond to the outer end portions 110 of the respective engaging pieces 98. Each of the operating protrusions 100 protrudes from a corresponding one of the long sides of the rectangular bottom surface portion 94 toward the inner circumferential surface of the ornament mount hole 34 in a direction perpendicular to the wheel axis. This construction makes it easier for the operator to pull out the stopper 26 in the state in which the pair of engaging pieces 98 are bent by the operator. Each of the operating protrusions 100 is one example of a protrusion.

Slits

The slits 102 are through holes or cuts having a cross shape that is substantially identical to the shape of the cross-shaped protrusion 84. The slits are formed in the rectangular bottom surface portion 94. When the two distal end protrusions 106 of each of the pair of insertion portions 96 of the stopper 26 are respectively inserted into the space formed between the corresponding engaging hook 68 and the outer circumferential surface of the cylindrical side surface portion 88, the cross-shaped protrusion 84 is inserted through the slits 102. The slits 102 are one example of a through hole.

Guide Protrusions

As illustrated in FIG. 5A, each of the guide protrusions 104 is a plate extending perpendicularly to the rectangular bottom surface portion 94 from an inner surface (nearer to the vehicle) of the rectangular bottom surface portion 94 toward the inside (toward the coupling bottom surface 74a in the temporarily holding state of the stopper 26). The six guide protrusions 104 include four guide protrusions 104a and two guide protrusions 104b. The guide protrusions 104a are parallel with the long side of the rectangular bottom surface portion 94. Each two of the four guide protrusions 104a are formed integrally with a corresponding one of the pair of insertion portions 96.

The two guide protrusions 104b are parallel with the short side of the rectangular bottom surface portion 94. Each of the two guide protrusions 104b is provided between a corresponding one of the long sides of the rectangular bottom surface portion 94 and a point of the intersection of the slits 102. One end of each of the guide protrusions 104a and the guide protrusions 104b is contiguous to a corresponding one or two of the slits 102. Each of the guide protrusions 104 is one example of a second guide.

Procedure of Installing Wheel Cover

There will be next explained a procedure of installing the wheel cover 10 on the wheel 14. In the present embodiment, the procedure of installing the wheel cover 10 on the wheel 14 includes the following four steps: (i) temporarily holding the stopper 26 on the center piece 24; (ii) mounting the center piece 24 onto the cover body 18 to provide the wheel cover 10 constituted by the three components integrally with each other; (iii) mounting the wheel cover 10 onto the wheel 14; and (iv) pressing the stopper 26 inward to fasten the wheel cover 10 to prevent removal of the wheel cover 10 from the wheel 14.

FIG. 8A is a perspective view of the wheel cover 10 in the installed state thereof, viewed from the outside of the vehicle. FIG. 8B is a cross-sectional view of the center piece 24, the stopper 26, and an inside of the ornament mount hole 34 in the installed state of the wheel cover 10, schematically illustrating a positional relationship among them. FIG. 8B omits illustration of the coupler 64 and the flange 62 of the center piece 24, the cover body 18, and the components of the wheel 14 other than the ornament mount hole 34.

(i) Temporary Holding of Stopper 26 on Center Piece 24

The operator positions the pair of insertion holes 82 of the center piece 24 respectively to the pair of engaging pieces 98 of the stopper 26, then holds outer surfaces of the pair of engaging pieces 98, and then inserts the pair of engaging pieces 98 respectively into the pair of insertion holes 82. In this insertion, the pair of engaging pieces 98 are respectively inserted into the pair of insertion holes 82 in the state in which the respective resilient deformation portions 114 of the pair of engaging pieces 98 are bent. When the pair of temporarily-holding hooks 116 are respectively inserted through the pair of insertion holes 82, the six guide protrusions 104 become contactable with the cross-shaped protrusion 84, thereby establishing a state in which the cross-shaped protrusion 84 guides the six guide protrusions 104. As illustrated in FIG. 5B, the operator inserts the pair of engaging pieces 98 into the pair of insertion holes 82 until the pair of temporarily-holding hooks 116 having passed through the pair of insertion holes 82 are engaged with the coupling bottom surface portion 74.

In the temporarily holding state of the stopper 26, since the pair of temporarily-holding hooks 116 are engaged with the coupling bottom surface portion 74, the stopper 26 is never disengaged from the center piece 24 toward the outside. As described above, the thickness of each of the pair of engaging pieces 98 increases with increase in distance from the temporarily-holding hook 116 toward the protruding edge located nearer to the distal end of the lock groove 118. Thus, the lock grooves 118 do not pass through the pair of insertion holes 82 unless the operator applies an inward force to the pair of engaging pieces 98. As long as the stopper 26 is not disengaged from the center piece 24, each of the pair of engaging pieces 98 is movable inward and outward between the temporarily-holding hook 116 and the protruding edge located nearer to the distal end of the lock groove 118. However, even in the case where the stopper 26 is located at any position, the stopper 26 becomes the temporarily holding state.

(ii) Mounting Center Piece 24 onto Cover Body 18 in Temporarily Holding State The operator inserts the cylindrical portion 66 and the coupler 64 of the center piece 24 into the engagement hole 22 formed in the cover body 18 in the temporarily holding state of the stopper 26. In this state, the engagement protrusions 80 of the center piece 24 are engaged with the engagement-hole periphery 70 of the cover body 18, whereby the center piece 24 is mounted on the cover body 18. Thus, the center piece 24, the stopper 26, and the cover body 18 are integrated.

(iii) Installing Wheel Cover 10 onto Wheel 14

The operator inserts the center piece 24 of the integrated wheel cover 10 into the ornament mount hole 34 formed in the wheel 14. In this insertion, the operator pushes the center piece 24 inward until the pair of outer-circumferential protrusions 90 are moved over the inner-circumferential engaging portion 36. Since the inner-circumferential engaging portion 36 is provided around the ornament mount hole 34, there is no need to position the center piece 24 and the inner-circumferential engaging portion 36 to each other. After being moved over a protruding edge of the inner-circumferential engaging portion 36, the outer-circumferential protrusions 90 are engaged with the inner-circumferential engaging portion 36. In this state, the center piece 24 is not inserted inward any more, and the stopper 26 is in the temporarily holding state.

(iv) Pushing Stopper 26

The operator pushes the stopper 26 inward in the temporarily holding state and in the state in which the wheel cover 10 is installed on the wheel 14 until the stopper 26 is stopped. When the stopper 26 located at the position illustrated in FIG. 6B is pushed inward, the six guide protrusions 104 of the stopper 26 are guided by the cross-shaped protrusion 84 of the center piece 24, so that the stopper 26 is stopped in the state illustrated in FIG. 7B. In this state, as illustrated in FIG. 8B, the two distal end protrusions 106 of each of the pair of insertion portions 96 are inserted in the space formed between the corresponding engaging hook 68 and the outer circumferential surface of the cylindrical side surface portion 88, and distal ends of the two distal end protrusions 106 come into contact with the bottom of the space, i.e., a portion of the center piece 24 which defines an inner end portion of the space. Also, as illustrated in FIG. 7B, the respective lock grooves 118 formed in the pair of engaging pieces 98 are respectively moved through the pair of insertion holes 82 and engaged with the coupling bottom surface portion 74. This engagement prevents further inward movement of the stopper 26.

As illustrated in FIG. 8A, the operator visually recognizes that the cross-shaped protrusion 84 of the center piece 24 is inserted through the slits 102 of the stopper 26, and a distal end of the cross-shaped protrusion 84 is exposed to the outside from the rectangular bottom surface portion 94.

Procedure of Removal of Wheel Cover

There will be next explained a procedure of removing, from the wheel 14, the wheel cover 10 installed in the above-described procedure. The procedure of removing the wheel cover 10 includes the following two steps: (i) pulling the stopper 26 outward to establish the temporarily holding state again and (ii) pulling the center piece 24 out of the ornament mount hole 34.

(i) Pulling Stopper 26

The operator bends the pair of engaging pieces 98 and disengages the respective lock grooves 118 formed in the pair of engaging pieces 98 from the coupling bottom surface portion 74. When the operator pulls the stopper 26 outward in this state, the pair of engaging pieces 98 are moved outward, and the respective lock grooves 118 formed in the pair of engaging pieces 98 pass through the respective insertion holes 82. The operator pulls the stopper 26 until the temporarily-holding hooks 116 provided at the distal ends of the respective engaging pieces 98 are engaged with the coupling bottom surface portion 74. In this operation, the two distal end protrusions 106 of each of the insertion portions 96 comes out of the space formed between the corresponding engaging hook 68 and the outer circumferential surface of the cylindrical side surface portion 88. The pair of insertion portions 96 are moved outward until the cutouts 108 are respectively opposed to the pair of handles 92. During this movement, the pair of temporarily-holding hooks 116 are engaged with the coupling bottom surface portion 74, so that the stopper 26 becomes the temporarily holding state illustrated in FIG. 6B.

(ii) Pulling Center Piece 24

The operator inserts his or her fingers into the pair of through holes 76 formed in the cylindrical side-surface portion 72 and pulls out the center piece 24 outward in the state in which the handles 92 of the respective engaging hooks 68 are bent toward the respective cylindrical side surface portions 88. The bending of the pair of handles 92 moves the pair of engaging hooks 68 toward the respective cylindrical side surface portions 88, thereby establishing a state in which the outer-circumferential protrusions 90 of the respective engaging hooks 68 can be moved over the inner-circumferential engaging portion 36. By pulling out the center piece 24 outward in this state, the operator can move the center piece 24 outward. Each of the bent handles 92 is moved in the cutout 108 formed between the two distal end protrusions 106 of the corresponding insertion portion 96. Thus, the pair of handles 92 never contact the pair of insertion portions 96. When the center piece 24 is pulled out outward, the stopper 26 and the cover body 18 are also removed from the wheel 14.

In the present embodiment as described above, in the final step of the procedure of installing the wheel cover 10 on the wheel, the two distal end protrusions 106 of each of the pair of insertion portions 96 of the stopper 26 are inserted into the space between the corresponding engaging hook 68 of the center piece 24 and the outer circumferential surface of the corresponding cylindrical side surface portion 88. With this construction, when the wheel cover 10 is removed from the wheel 14, the pair of engaging hooks 68 receiving a force can by supported by the stiff cylindrical portion 66 via the distal end protrusions 106. This support makes it difficult for the wheel cover 10 to be removed from the wheel 14.

The stopper 26 includes the two distal end protrusions 106 on each of the pair of insertion portions 96. The pair of insertion portions 96 are spaced apart from each other in the inner circumferential direction of the ornament mount hole 34. This construction enables the distal end protrusions 106 to support a load acting on the pair of engaging hooks 68, at a plurality of positions.

The respective lock grooves 118 formed in the pair of engaging pieces 98 keep the position of the stopper 26 in the installed state of the wheel cover 10, thereby preventing the stopper 26 from being removed from the center piece 24. This makes it difficult for the wheel cover 10 to be removed from the wheel 14.

The temporarily-holding hooks 116 of the respective engaging pieces 98 temporarily hold the stopper 26 on the center piece 24, making it possible to handle the center piece 24 and the stopper 26 as a single component, resulting in improved efficiency of the installation.

The distal end of each of the pair of engaging pieces 98 has a hook as a portion of the temporarily-holding hook 116. Also, the temporarily-holding hook 116 is provided nearer to the distal end of the engaging piece 98 than the lock groove 118. This construction allows the operator only to push the stopper 26 inward to move the stopper 26 from its position in the temporarily holding state to its position in the installed state of the wheel cover 10.

Each of the pair of engaging pieces 98 has a shape allowing the engaging piece 98 to be easily bent. Also, the operating protrusion 100 is provided at the position at which the engaging piece 98 and the rectangular bottom surface portion 94 are coupled to each other, resulting in improved efficiency of the removal.

When the stopper 26 is mounted on the center piece 24, the six guide protrusions 104 are guided by the cross-shaped protrusion 84. The stopper 26 is thereby guided by the center piece 24 in the state in which the pair of insertion portions 96 are respectively opposed to the pair of engaging hooks 68, in which the pair of engaging pieces 98 are respectively opposed to the pair of insertion holes 82, and in which the rectangular bottom surface portion 94 is parallel with the coupling bottom surface portion 74.

In the installed state of the wheel cover 10, the distal end of the cross-shaped protrusion 84 is exposed from the slits 102 of the stopper 26. This construction allows the operator to visually recognize that the stopper 26 is mounted on the center piece 24.

The inner end portion of the cylindrical portion 66 which is defined by the cylindrical side surface portions 88 is open. Thus, the drive shaft 56 can be inserted in the cylindrical side surface portions 88. This construction enables the wheel cover 10 to be installed on the wheel assembly 16 as the drive wheel. It is noted that the drive shaft 56 may not be inserted in the cylindrical side surface portions 88 as in the present embodiment. Thus, the wheel cover 10 may be installed on a driven wheel.

The wheel cover 10 installed on the wheel 14 may be removed from the wheel 14 in a procedure different from the procedure described above. For example, while the stopper 26 is pulled in the step (i) until the stopper 26 becomes the temporarily holding state, the stopper 26 may be completely removed from the center piece 24. That is, the operator bends the pair of engaging pieces 98 and pulls the stopper 26 until the stopper 26 passes through the pair of insertion holes 82, without the temporarily-holding hooks 116 being engaged with the coupling bottom surface portion 74. As a result of this operation, the stopper 26 is completely removed from the center piece 24. The procedure after this operation is the same as the step (ii) described above.

Figure 9:
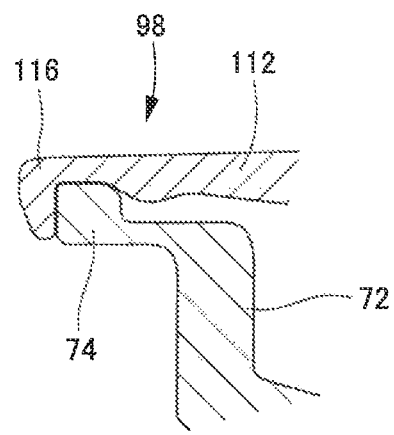
FIG. 9 is a cross-sectional view of a stopper in an alternative embodiment which is mounted on the center piece.

In an alternative embodiment, the stopper 26 illustrated in FIG. 9 may be employed. FIG. 9 is an enlarged cross-sectional view of the center piece 24 and the stopper 26 in the alternative embodiment, illustrating an area at which the center piece 24 and the stopper 26 are engaged with each other. As illustrated in FIG. 9, each of the temporarily-holding hooks 116 may have a protruding edge at a position nearer to the lock groove 118. In this construction, the protruding edge located nearer to the lock groove 118 is preferably smaller in size than the protruding edge located nearer to the distal end.

What is claimed is:

1. A wheel cover, comprising:
    a cover body that is formed with an engagement hole at a center of the cover body and that covers a design face of a wheel of a vehicle; and
    a cover fastener that is inserted through the engagement hole of the cover body to install the cover body on the wheel,
    wherein the cover fastener comprises a primary attachment member and a secondary attachment member,
    wherein the primary attachment member comprises:
        a supporter that supports a periphery of the engagement hole;
        a cylindrical portion that is inserted in a hub hole formed at a center of the wheel;
        a coupler that couples the supporter and the cylindrical portion to each other; and
        a hook extending from the cylindrical portion to an outer circumferential side of the cylindrical portion, the hook being contactable with an inner circumferential portion of the hub hole at a position spaced apart from an outer circumferential surface of the cylindrical portion, and
    wherein the secondary attachment member comprises an insertion portion that is inserted in a space formed between the hook and the outer circumferential surface of the cylindrical portion.

2. The wheel cover according to claim 1, wherein the hook of the primary attachment member is engageable with an inner-circumferential engaging portion formed at the inner circumferential portion of the hub hole.

3. The wheel cover according to claim 1,
    wherein the primary attachment member comprises a plurality of hooks each as the hook,
    wherein the secondary attachment member comprises a plurality of insertion portions each as the insertion portion, and
    wherein each of the plurality of insertion portions is inserted in a space formed between the outer circumferential surface of the cylindrical portion and a corresponding one of the plurality of hooks.

4. The wheel cover according to claim 3,
    wherein the primary attachment member further comprises a first engaging portion, and
    wherein the secondary attachment member further comprises a lock engaging portion that is engaged with the first engaging portion when the insertion portion is inserted in a space formed between the cylindrical portion and the hook.

5. The wheel cover according to claim 4,
    wherein the secondary attachment member comprises an engaging piece comprising the lock engaging portion, and
    wherein the engaging piece comprises a temporarily-holding engaging portion that is located nearer to a distal end of the engaging piece than the lock engaging portion and that is engaged with the first engaging portion.

6. The wheel cover according to claim 5, wherein a thickness of the engaging piece increases with increase in distance from the temporarily-holding engaging portion toward the lock engaging portion.

7. The wheel cover according to claim 5, wherein the secondary attachment member comprises a base portion that couples the plurality of insertion portions to each other.

8. The wheel cover according to claim 7,
wherein the secondary attachment member comprises a plurality of engaging pieces each as the engaging piece,
wherein the base portion is configured to couple the plurality of engaging pieces to each other, and
wherein a plurality of protrusions are formed each at a portion of the base portion which is coupled to a corresponding one of the plurality of engaging pieces.

9. The wheel cover according to claim 1,
wherein the primary attachment member further comprises a first facing surface,
wherein the secondary attachment member further comprises a second facing surface that is opposed to the first facing surface when the secondary attachment member is mounted on the primary attachment member,
wherein the first facing surface comprises a first guide, and
wherein the second facing surface comprises a second guide that guides the first guide.

10. The wheel cover according to claim 9,
wherein the first guide is provided on the first facing surface so as to extend from the first facing surface toward the second facing surface, and
wherein the second guide is provided on the second facing surface so as to extend from the second facing surface toward the first facing surface.

11. The wheel cover according to claim 1,
wherein the primary attachment member comprises a first guide, and
wherein the secondary attachment member comprises a through hole in which the first guide is insertable.

12. The wheel cover according to claim 1, wherein the cylindrical portion comprises an opening (34) that opens toward an inside of the vehicle.

13. A method of installing a wheel cover onto a wheel, the wheel cover comprising: a cover body that covers a design face of the wheel of a vehicle; a primary attachment member that supports the cover body and comprises (i) a supporter, (ii) a cylindrical portion, (iii) a coupler that couples the supporter and the cylindrical portion to each other, and (iv) a hook extending from the cylindrical portion; and a secondary attachment member comprising an insertion portion that is inserted in a space formed between the hook and an outer circumferential surface of the cylindrical portion,
the method comprising:
mounting the secondary attachment member onto the primary attachment member in a state in which the insertion portion is not inserted in the space formed between the hook and the outer circumferential surface of the cylindrical portion;
mounting the primary attachment member and the secondary attachment member onto the cover body to establish a state in which the cylindrical portion and the hook are inserted in an engagement hole formed at a center of the cover body;
mounting the cover body, the primary attachment member, and the secondary attachment member onto the wheel to establish a state in which the cylindrical portion and the hook are inserted in a hub hole formed in the wheel; and
pushing the secondary attachment member into the primary attachment member to establish a state in which the insertion portion is inserted into the space formed between the hook and the outer circumferential surface of the cylindrical portion.

\* \* \* \* \*